US012613498B2

(12) United States Patent
Igi

(10) Patent No.: US 12,613,498 B2
(45) Date of Patent: Apr. 28, 2026

(54) ELECTRONIC DEVICE AND TIMEPIECE

(71) Applicant: CASIO COMPUTER CO., LTD., Tokyo (JP)

(72) Inventor: Hiroki Igi, Yokohama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 353 days.

(21) Appl. No.: 18/326,177

(22) Filed: May 31, 2023

(65) Prior Publication Data

US 2023/0384740 A1 Nov. 30, 2023

(30) Foreign Application Priority Data

May 31, 2022 (JP) ................................ 2022-088952

(51) Int. Cl.
*G04G 17/06* (2006.01)

(52) U.S. Cl.
CPC .................................... *G04G 17/06* (2013.01)

(58) Field of Classification Search
None
See application file for complete search history.

(56) References Cited

U.S. PATENT DOCUMENTS

| | | | |
|---|---|---|---|
| 11,221,591 | B2 | 1/2022 | Nakajima |
| 2019/0294120 | A1 | 9/2019 | Nakajima |

FOREIGN PATENT DOCUMENTS

| | | | | |
|---|---|---|---|---|
| DE | 102005033911 A1 | 2/2007 | | |
| JP | H023669 U * | 1/1990 | ............ H01R 13/11 | |
| JP | H023669 U1 | 1/1990 | | |
| JP | 2018-197759 A | 12/2018 | | |
| JP | 6590044 B2 | 10/2019 | | |

OTHER PUBLICATIONS

STIC full text translation of JP H023669 (Year: 2025).*
Notice of Reasons for Refusal dated Apr. 23, 2024 received in Japanese Patent Application No. JP 2022-088952.
Extended European Search Report dated Oct. 19, 2023 received in European Patent Application No. EP 23173303.1.
Office Action dated Sep. 9, 2025 received in European Patent Application No. 23 173 303.1.

* cited by examiner

*Primary Examiner* — Regis J Betsch
*Assistant Examiner* — Michael James Walker
(74) *Attorney, Agent, or Firm* — Scully, Scott, Murphy & Presser, P.C.

(57) ABSTRACT

An electronic device including a first contact member, a second contact member which is arranged opposing the first contact member, a resilient conductive member which electrically connects the first contact member with the second contact member, and a resilient guide holding member having a guide portion which guides the resilient conductive member in opposing directions of the first contact member and the second contact member, and a resilient holding portion which holds the guide portion such that the guide portion is resiliently movable in the opposing directions of the first contact member and the second contact member.

11 Claims, 12 Drawing Sheets

ELECTRONIC DEVICE AND TIMEPIECE

CROSS-REFERENCE TO RELATED APPLICATION

This application is based upon and claims the benefit of priority from the prior Japanese Patent Application No. 2022-088952, filed May 31, 2022, the entire contents of which is incorporated herein by reference.

BACKGROUND OF THE INVENTION

1. Field of the Invention

The present invention relates to an electronic device and a timepiece such as a wristwatch.

2. Description of the Related Art

For example, Japanese Patent Application Laid-Open (Kokai) Publication No. 2018-197759 discloses an electronic device such as a wristwatch which has a structure where a cylindrical member has been arranged between a circuit board and a solar panel, a coil spring has been inserted into and arranged in the cylindrical member so as to electrically connect the circuit board and the solar panel.

SUMMARY OF THE INVENTION

In order to solve the above-described problem, in accordance with one aspect of the invention, there is provided an electronic device comprising: a first contact member; a second contact member which is arranged opposing the first contact member; a resilient conductive member which electrically connects the first contact member with the second contact member; and a resilient guide holding member having a guide portion which guides the resilient conductive member in opposing directions of the first contact member and the second contact member, and a resilient holding portion which holds the guide portion such that the guide portion is resiliently movable in the opposing directions of the first contact member and the second contact member.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment in which the present invention has been applied in a wristwatch will hereinafter be described with reference to FIG. 1 to FIG. 12B.

Figure 1:
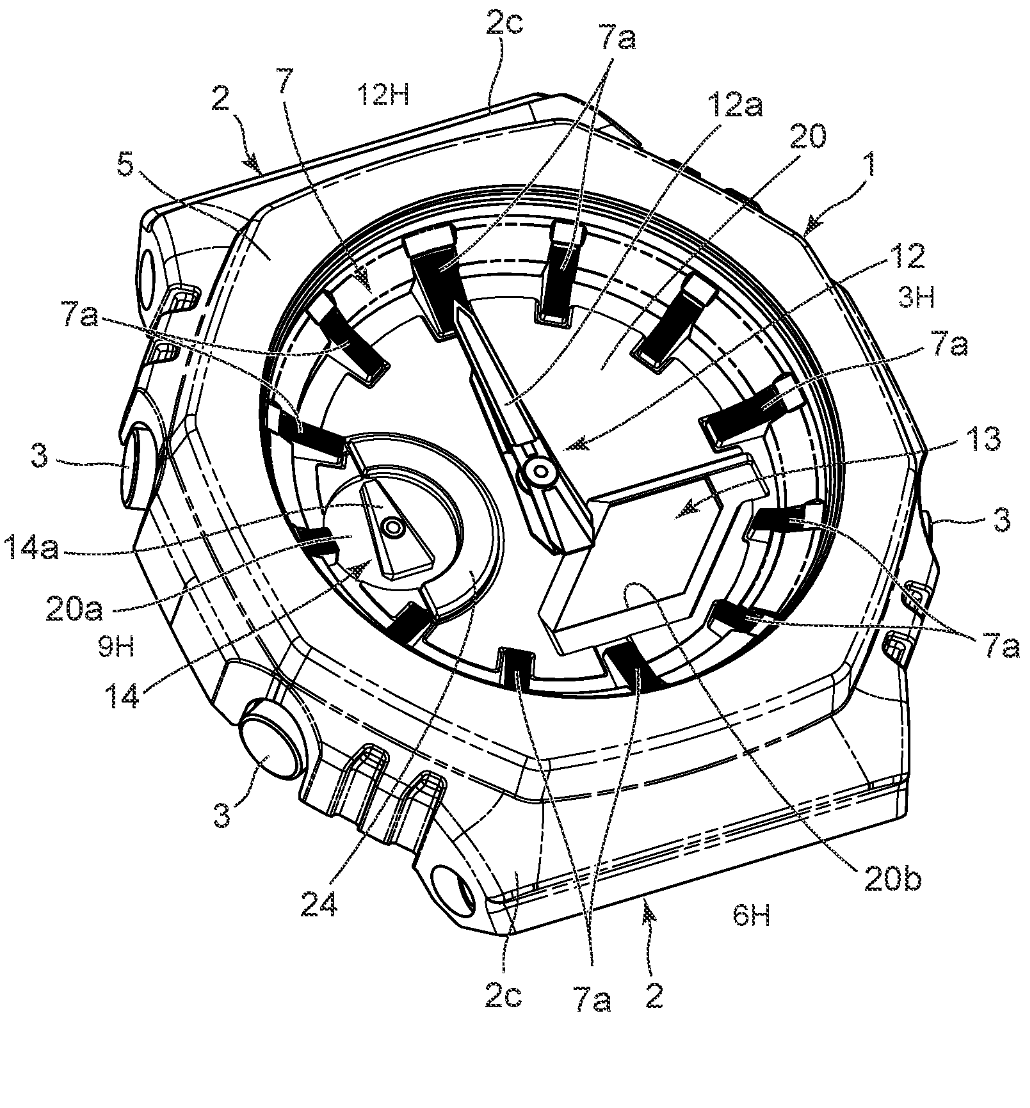
FIG. 1 is an enlarged perspective view of an embodiment in which the present invention has been applied in a wristwatch.
Figure 2:
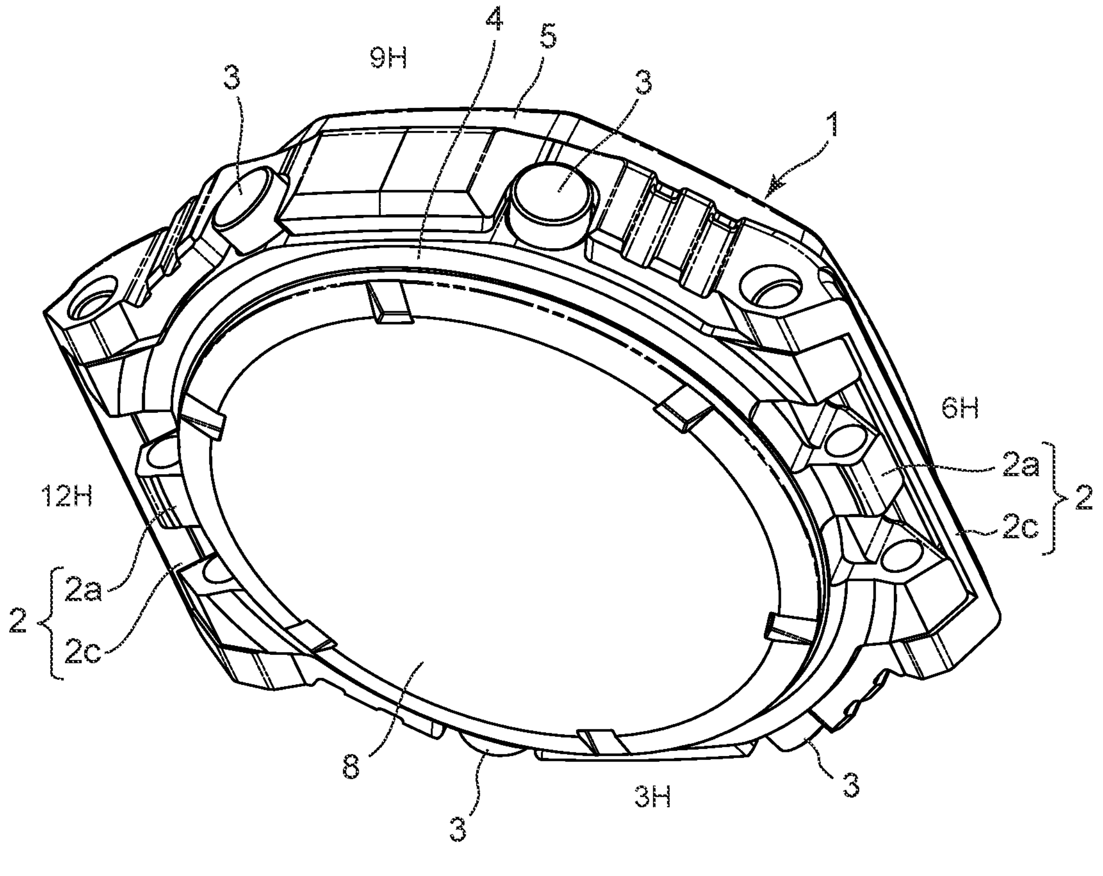
FIG. 2 is an enlarged perspective view showing the wristwatch of FIG. 1 when viewed from diagonally below.

This wristwatch includes a wristwatch case 1, as shown in FIG. 1 and FIG. 2. On the six o'clock side and twelve o'clock side of the wristwatch case 1, band attachment sections 2 are provided to which watch bands (not shown) are attached. In addition, on the two o'clock side, four o'clock side, eight o'clock side, and ten o'clock side of the wristwatch case 1, switch sections 3 are provided.

In the structure of the above-described conventional technique, an end portion of the coil spring protrudes from an end of the cylindrical member and resiliently comes in contact with the circuit board or the solar panel. Accordingly, when the circuit board or the solar panel is rotated, deformation such as the buckling of the end portion of the coil spring protruding from the end of the cylindrical member may occur. That is, a stable and reliable connection between the circuit board and the solar panel cannot be achieved.

Therefore, a space is formed between the circuit board or the solar panel and an end of the cylindrical member corresponding thereto, and a buckling prevention section is formed on an end portion of the coil spring located in this space so as to prevent deformation such as the buckling of the end portion of the coil spring by this buckling prevention section and achieve a stable connection between the circuit board and the solar panel.

In this conventional structure, deformation such as the buckling of the coil spring can be suppressed by the buckling prevention section. However, there is a problem in that stress in the coil spring is increased by the presence of the buckling prevention section, and repulsive force against the circuit board and the solar panel is increased, whereby loads on the solar panel are increased.

The present embodiment is to improve this situation, and has a structure capable of preventing deformation such as buckling, lightening stress, and suppressing loads.

Figure 3:
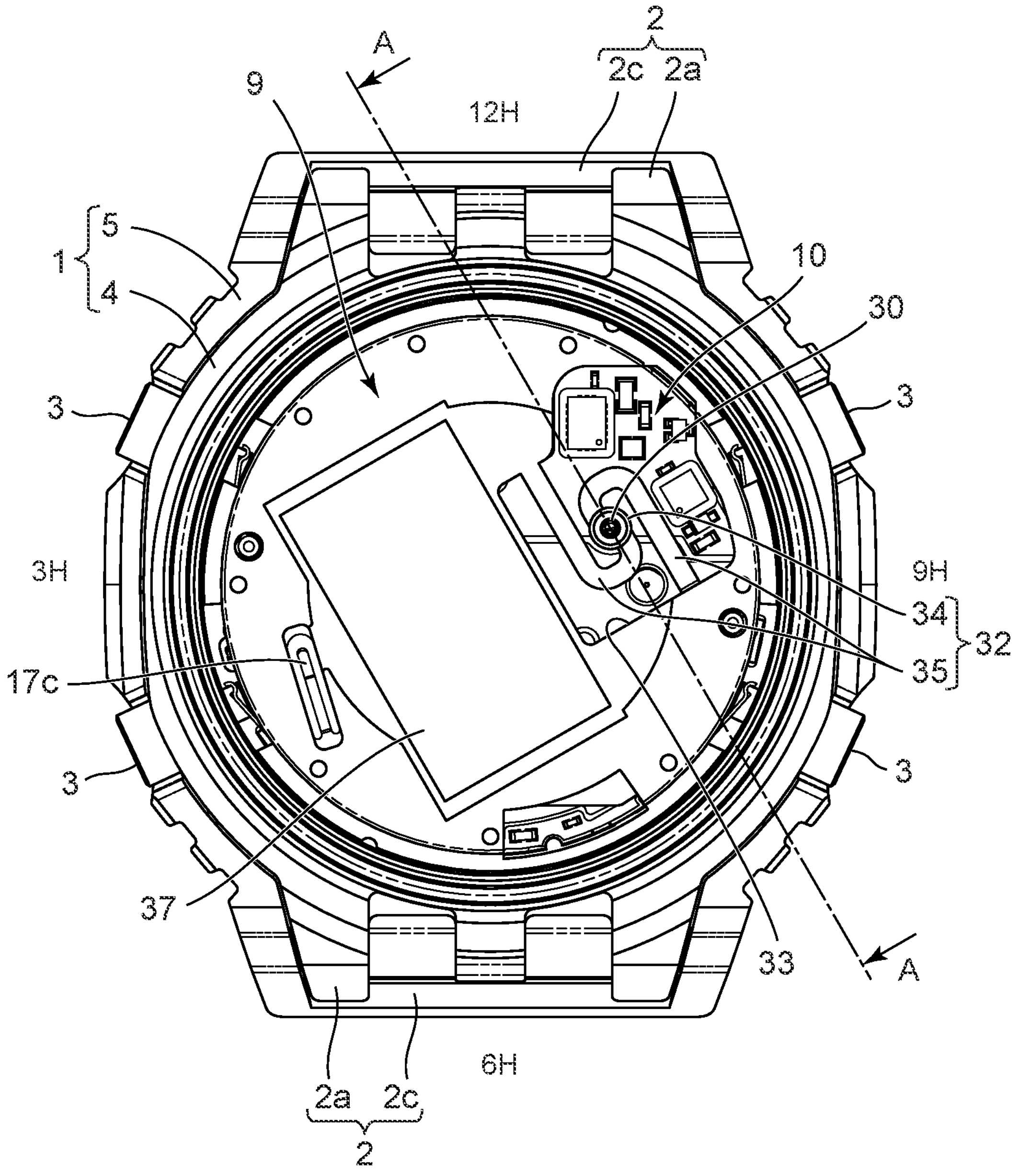
FIG. 3 is an enlarged bottom view showing the wristwatch of FIG. 2 with a back cover being detached.
Figure 4:
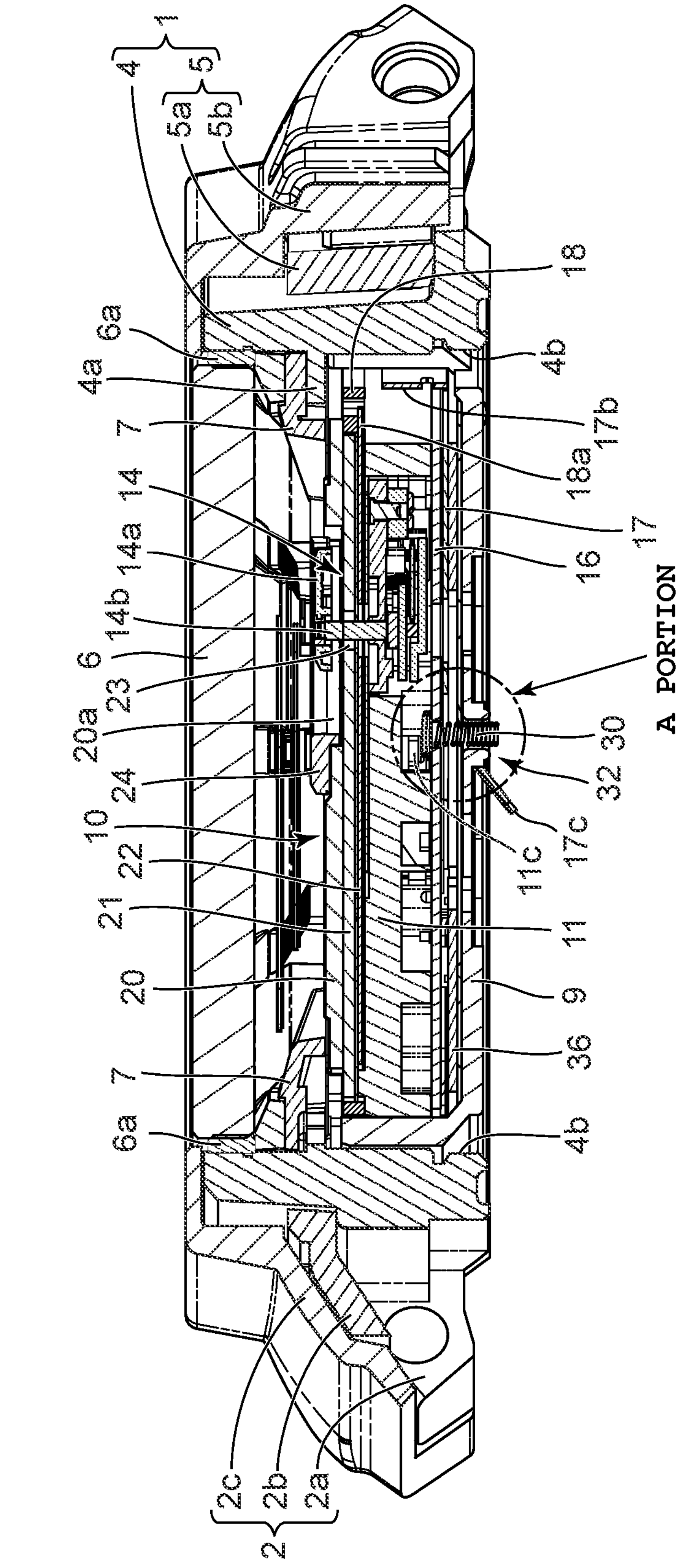
FIG. 4 is an enlarged sectional view of the wristwatch inverted and taken along the A-A arrow view in FIG. 3.
Figure 5:
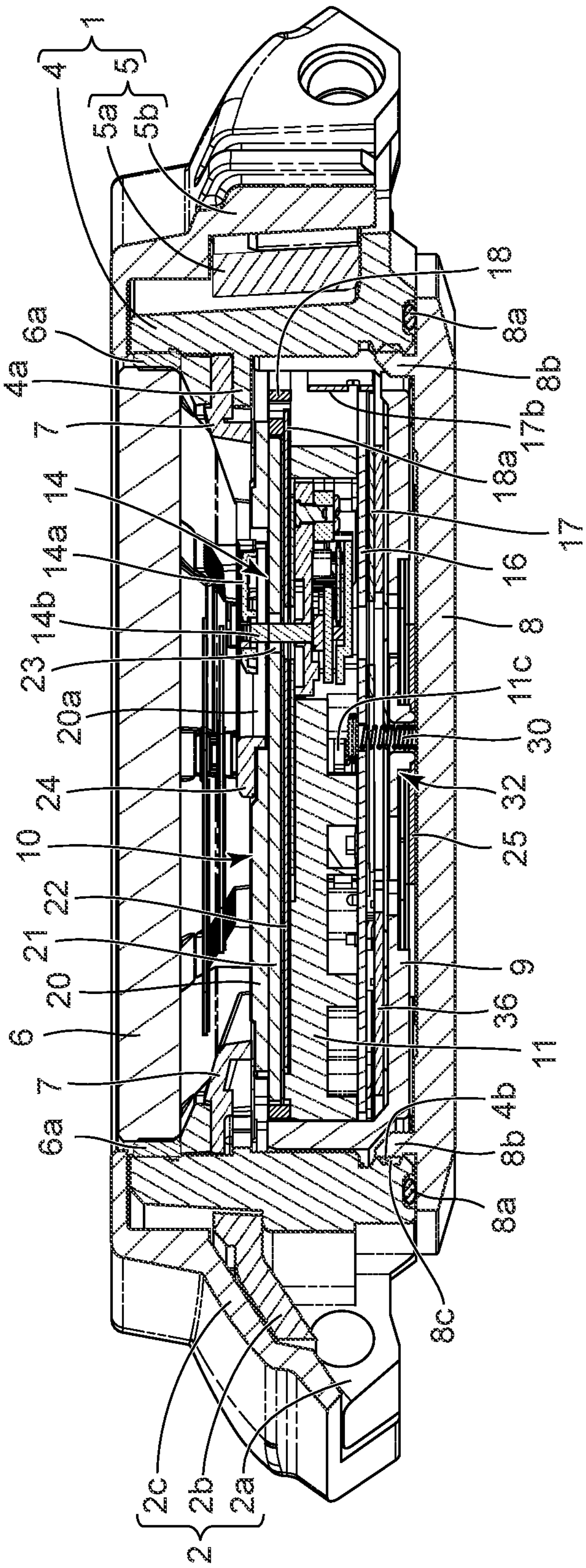
FIG. 5 is an enlarged sectional view showing the wristwatch of FIG. 4 with the back cover being attached to the lower part of a wristwatch case.

The wristwatch case 1 of the present embodiment includes a main body case 4 and an exterior case 5, as shown in FIG. 2 to FIG. 5. The main body case 4 is made of a metal such as stainless steel or a highly rigid synthetic resin, and has a substantially cylindrical shape. On the twelve o'clock side and six o'clock side of the main body case 4, main body sections 2*a* of the band attachment sections 2 are formed. In addition, on an inner circumferential portion of the main body case 4, a flange section 4*a* is formed projecting in a ring shape, as shown in FIG. 4 and FIG. 5.

The exterior case 5 includes a first exterior member 5*a* which is arranged on an outer circumferential portion of the main body case 4, and a second exterior member 5*b* which is arranged on and covers the upper parts of the first exterior member 5*a* and the main body case 4, as shown in FIG. 4 and FIG. 5. The first exterior member 5*a* and the second exterior member are made of a metal such as stainless steel or a highly rigid synthetic resin, as with the main body case 4.

On the twelve o'clock side and six o'clock side of the first exterior member 5*a*, first cover sections 2*b* of the band attachment sections 2 are provided which are arranged on the main body sections 2*a* of the band attachment sections 2, as shown in FIG. 4 and FIG. 5 (Note that, in FIG. 4 and FIG. 5, only the first cover section 2*b* on the twelve o'clock side is shown). Also, on the twelve o'clock side and six o'clock side of the second exterior member 5*b*, second cover sections 2*c* of the band attachment sections 2 are provided which are arranged on and cover the first cover sections 2*b* of the band attachment sections 2 formed on the first exterior member 5*a* and the main body sections 2*a* of the band attachment sections 2 formed on the main body case 4 (Note that, in FIG. 4 and FIG. 5, only the second cover section 2*c* on the twelve o'clock side is shown).

To the upper opening of the main body case 4, a watch glass 6 is attached via a packing 6*a*, as shown in FIG. 4 and FIG. 5. In an area under this watch glass 6, a ring-shaped parting member 7 having hour markers 7*a* (refer to FIG. 1) is arranged on the flange section 4*a* of the main body case 4. Also, to the lower part of the main body case 4, a back cover 8 is attached via a waterproof ring 8*a*. This back cover 8 is made of a conductive metal such as stainless steel.

On the outer circumferential side of the upper surface of the back cover 8, or in other words, on the outer circumferential side of the inner surface of the back cover 8, a circular frame section 8*b* is formed, as shown in FIG. 5. On the outer circumferential surface of this frame section 8*b*, a male thread section 8*c* is formed. As a result, the back cover 8 is structured to be attached to the lower part of the main body case 4 via the waterproof ring 8*a* by the male thread section 8*c* being screwed into and tighten in a female thread section 4*b* formed in the inner circumferential surface of the lower opening of the main body case 4.

More specifically, the back cover 8 is structured such that, when being screwed into the female thread section 4*b* of the main body case 4 so as to be tighten, the male thread section 8*c* is moved in the back-to-front direction of the wristwatch case 1, that is, a vertical direction of the wristwatch case 1 while being laterally rotated with the back cover 8, as shown in FIG. 5. Also, in the main body case 4, a timepiece module 10 is provided via a middle frame 9 (refer to FIG. 10).

The timepiece module 10 has a housing 11 which is arranged in the middle frame 9, as shown in FIG. 4 to FIG. 9. This housing 11 is provided with a time indication display section 12 which displays and indicates the time by driving pointers 12*a* such as an hour pointer and a minute pointer, a display panel 13 which electrooptically displays information such as a time of day, a date, and a day of the week, an auxiliary information display section 14 which displays and indicates sub-functional information such as the remaining battery level of a battery 15 by driving a sub-pointer 14*a*, and a battery 15 (refer to FIG. 9).

On the lower part of this housing 11, a circuit board 16 which is a first contact member is provided, as shown in FIG. 4, FIG. 5, FIG. 7, and FIG. 9. To this circuit board 16, later-described electronic components such as a solar panel 22 and a piezoelectric element 25 are electrically connected in addition to the time indication display section 12, the display panel 13, the auxiliary information display section 14, and the battery 15. Also, under this circuit board 16, a base plate 17 is provided. This base plate 17 is formed of a thin plate made of a metal such as stainless steel, and attaches the circuit board 16 to the undersurface of the housing 11.

More specifically, this base plate 17 is structured such that a plurality of hook sections 17*a* are provided upright on outer circumferential portions of this base plate 17 along the outer circumferential surface of the housing 11 (refer to FIG. 9), and disengageably engage with a plurality of projection sections 11*b* formed on the outer circumferential surface of the housing 11, whereby the circuit board 16 is pressed against and attached to the undersurface of the housing 11, as shown in FIG. 4 and FIG. 5.

Figure 8:
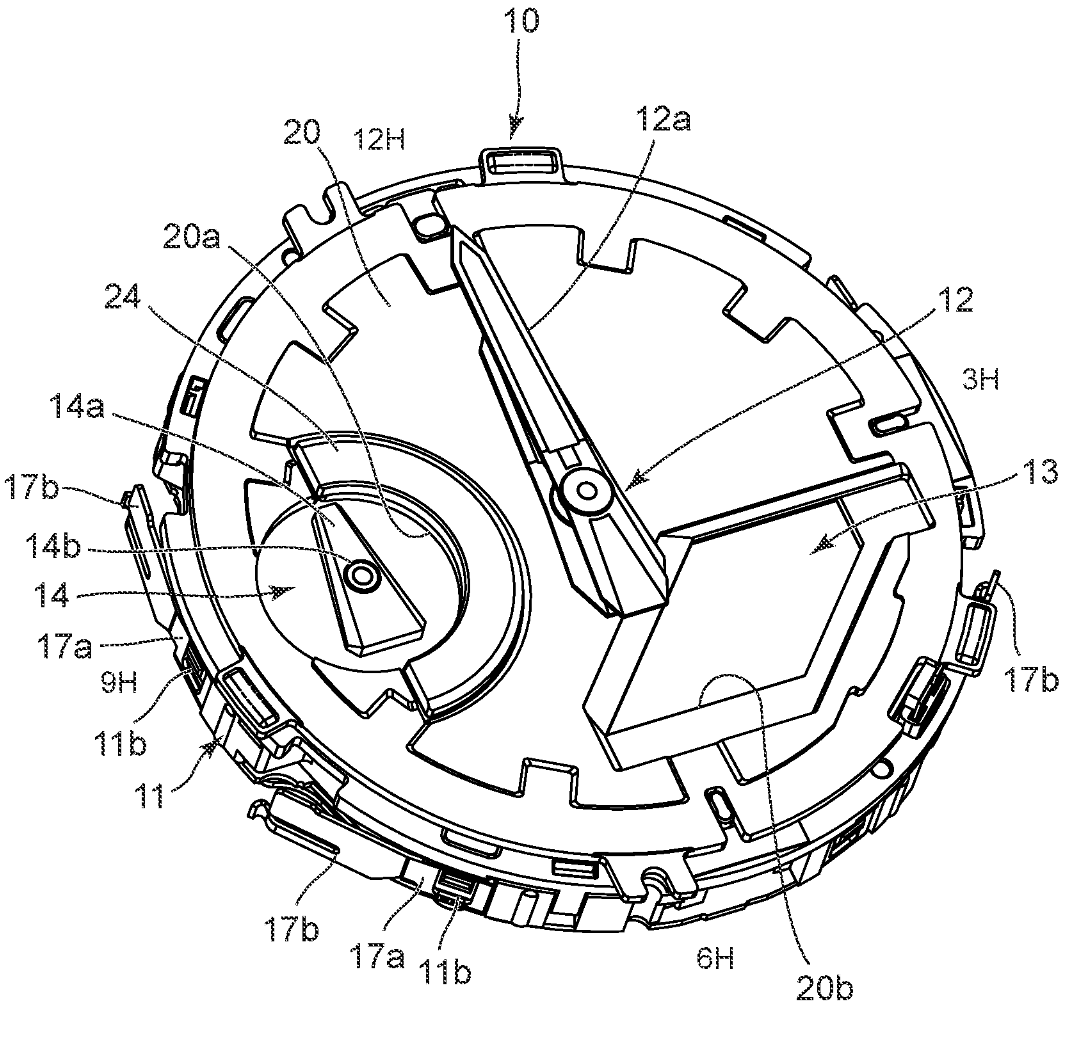
FIG. 8 is an enlarged perspective view showing the timepiece module of FIG. 6 when viewed from above.
Figure 9:
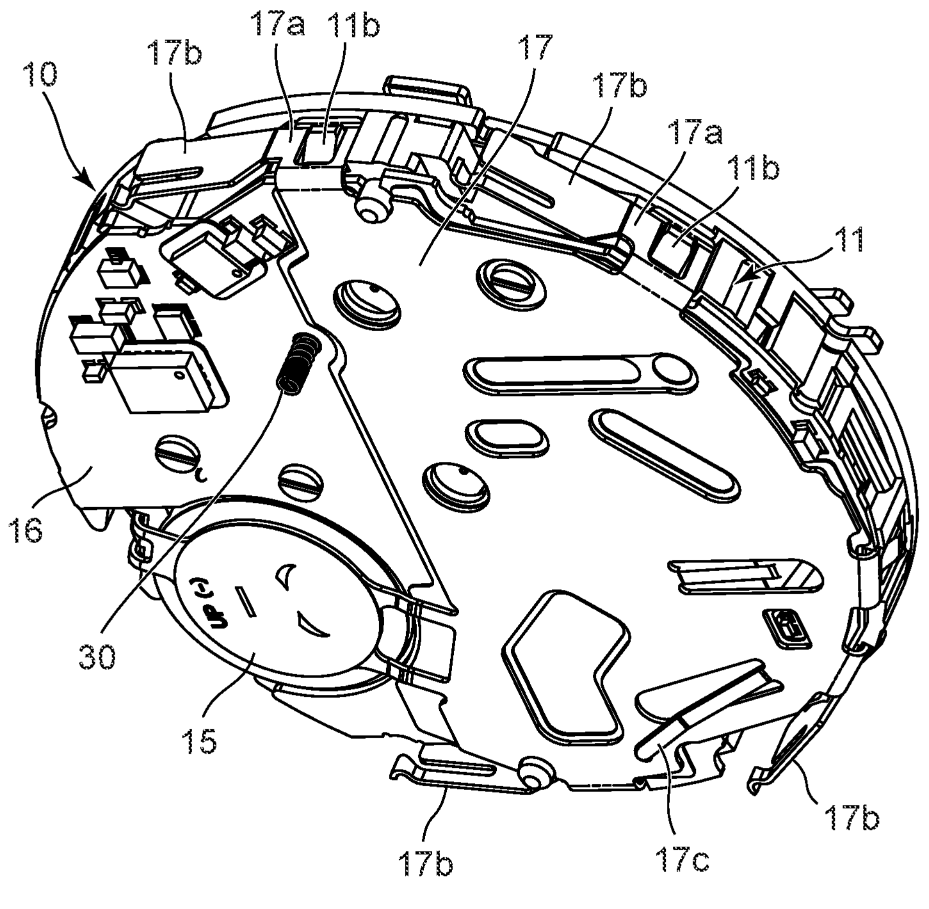
FIG. 9 is an enlarged perspective view showing the timepiece module of FIG. 8 when viewed from below.

On the plurality of hook sections 17*a* of the base plate 17, contact springs 17*b* are provided, as shown in FIG. 8 and FIG. 9. These plural contact springs 17*b* are plate springs extending along the outer circumference of the housing 11, and provided corresponding to a plurality of push button switches 3. More specifically, these contact springs 17*b*, which force the push button switches 3 in directions in which the push button switches 3 are pressed toward the outside of the wristwatch case 1, are structured to detachably come in contact with contact points (not shown) of the circuit board 16 when the push button switches 3 are pressed against the spring force, and thereby turn on the push button switches 3.

On the other hand, on the upper surface of the housing 11, a first dial plate 20 is arranged via a hold-down plate 18 having a ring shape, as shown in FIG. 4 and FIG. 5. This first dial plate 20 is formed such that its outer circumference is substantially equal to those of the housing 11 and the hold-down plate 18. As a result, the first dial plate 20 is structured such that its outer circumferential portion is arranged corresponding to the undersurface of the flange section 4*a* of the main body case 4 while being arranged on the hold-down plate 18.

In an area inside the hold-down plate 18 having the ring shape, a second dial plate 21 and the solar panel 22 are arranged overlapping with each other, as shown in FIG. 4. The solar panel 22 is arranged on the upper surface of the housing 11 and its outer circumferential portion is arranged on a stepped section 18*a* formed on the undersurface of the inner circumferential side of the hold-down plate 18. Also, the second dial plate 21, of which the outer circumference is formed to be substantially equal to the inner circumference of the hold-down plate 18, is arranged on the solar panel 22 while being arranged within the inner circumference of the hold-down plate 18.

The first dial plate 20, above which the pointers 12*a* of the time indication display section 12 are moved, is made of alight transmissive synthetic resin such as polycarbonate (PC), as shown in FIG. 1, and FIG. 4 to FIG. 6. Also, the second dial plate 21, above which the sub-pointer 14*a* of the auxiliary information display section 14 is rotated, is made of a light transmissive synthetic resin such as polycarbonate (PC), as in the case of the first dial plate 20.

As a result, the solar panel 22 is structured such that external light that has entered into the wristwatch case 1 from the outside of the wristwatch case 1 through the watch glass 6 is applied to the solar panel 22 through the first dial plate 20 and the second dial plate 21 and generates electromotive force, as shown in FIG. 4 and FIG. 5.

Figure 6:
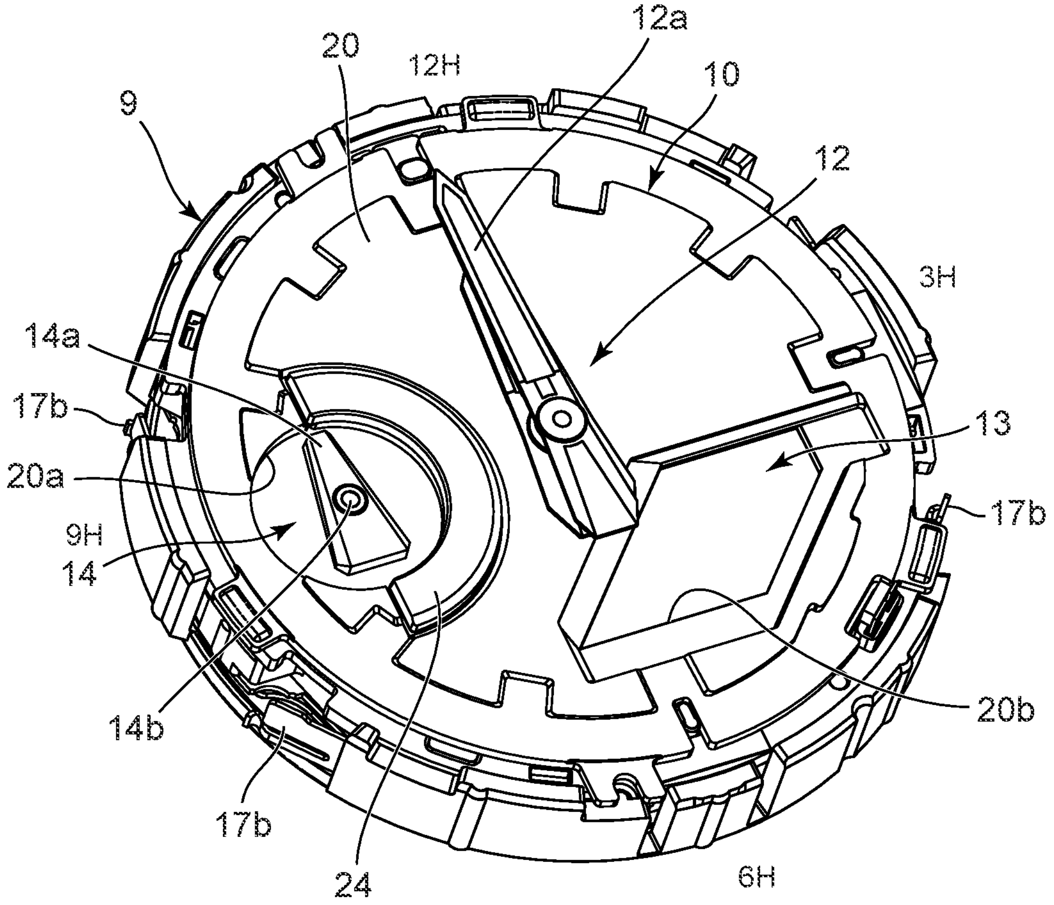
FIG. 6 is an enlarged perspective view showing a timepiece module to be arranged in the wristwatch case of FIG. 5, in which the timepiece module viewed from above has been housed in a middle frame.

On the five o'clock side of the first dial plate 20, the five o'clock side of the second dial plate 21, the five o'clock side of the solar panel 22, and the five o'clock side of the housing 11, display window sections 20*b* having substantially rhombus shapes are formed corresponding to the display area of the display panel 13, as shown in FIG. 1, FIG. 6, and FIG. 8. Also, in the center of the first dial plate 20, the center of the second dial plate 21, the center of the solar panel 22, and the center of the housing 11, through holes (not shown) are formed penetrating vertically, into which a pointer shaft (not shown) where the pointers 12*a* of the time indication display section 12 are attached is inserted.

Moreover, on the nine o'clock side of the first dial plate 20, a sub-display opening section 20*a* having a circular shape is formed corresponding to a sub-display area where the sub-pointer 14*a* of the auxiliary information display section 14 is rotated, as shown in FIG. 1, FIG. 4, FIG. 5, and FIG. 8. In a portion of the second dial plate 21 on the nine o'clock side, a portion of the solar panel 22 on the nine o'clock side, and a portion of the housing 11 on the nine o'clock side, insertion holes 23 corresponding to the center of the sub-display opening section 20*a* of the first dial plate 20 are formed penetrating vertically, into which a sub-pointer shaft 14*b* where the sub-pointer 14*a* of the auxiliary information display section 14 is attached is inserted.

Furthermore, on an outer circumferential portion of the sub-display opening section 20*a* of the first dial plate 20, a decoration section 24 having a substantially semi-circular shape is formed, as shown in FIG. 1, FIG. 4 to FIG. 6, and FIG. 8. This decoration section 24, which is a decorative reinforcement member, has scale marks (not shown) that indicate sub-functional information such as the remaining battery level of the battery 15 by indication by the sub-pointer 14*a*, and is made of a highly rigid synthetic resin. As a result, the timepiece module 10 is structured such that the flexural deformation of its portion corresponding to the decoration section 24 is suppressed.

Figure 11A:
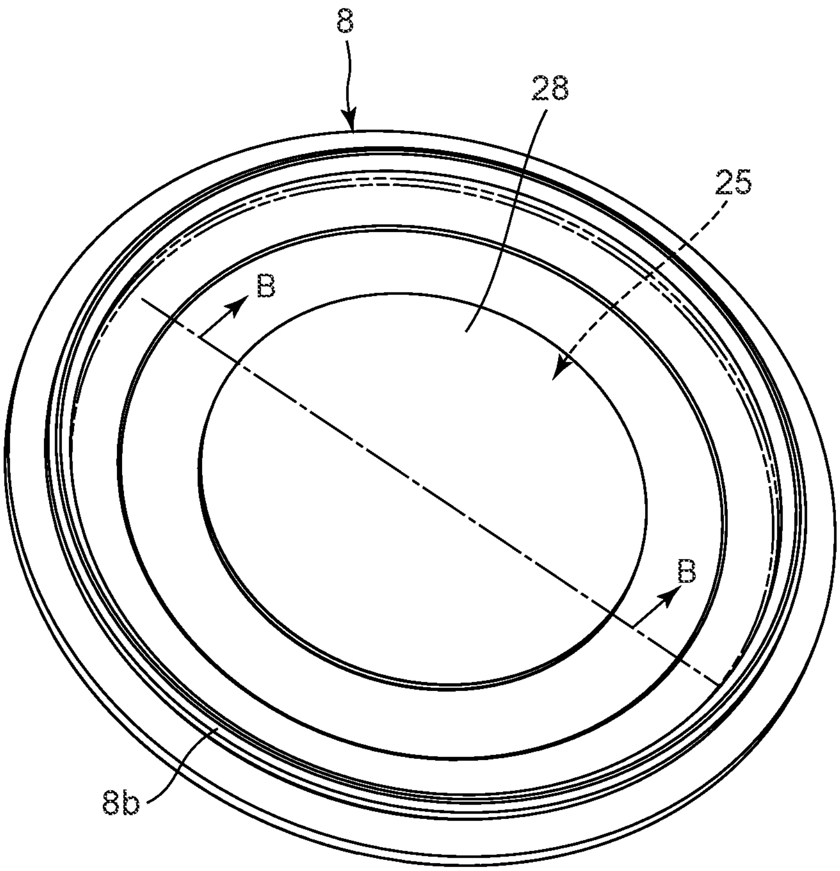
FIG. 11A is an enlarged perspective view showing the upper surface of the back cover shown in FIG. 2.
Figure 11B:
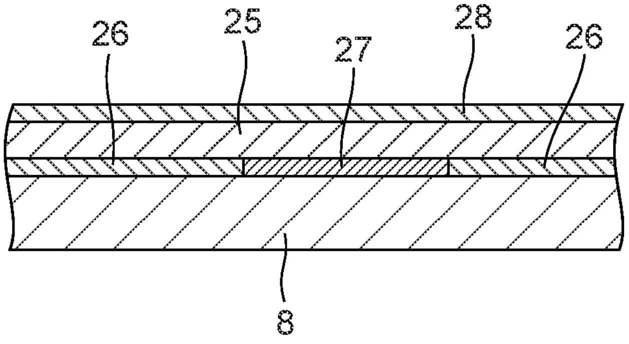
FIG. 11B is a sectional view showing an enlarged main portion taken along the B-B arrow view in FIG. 11A.

To the upper surface of the back cover 8, that is, the inner surface of the back cover 8 attached to the lower part of the wristwatch case 1, a piezoelectric element 25 which is a second contact member is adhered by an adhesion layer 26, as shown in FIG. 5, FIG. 11A, and FIG. 11B. This piezoelectric element 25, which vibrates and emits sounds when voltages are applied thereto, has a conductive section 27 provided on the center of its undersurface and is structured to be electrically connected to the back cover 8 by the conductive section 27, as shown in FIG. 11B.

Figure 7:
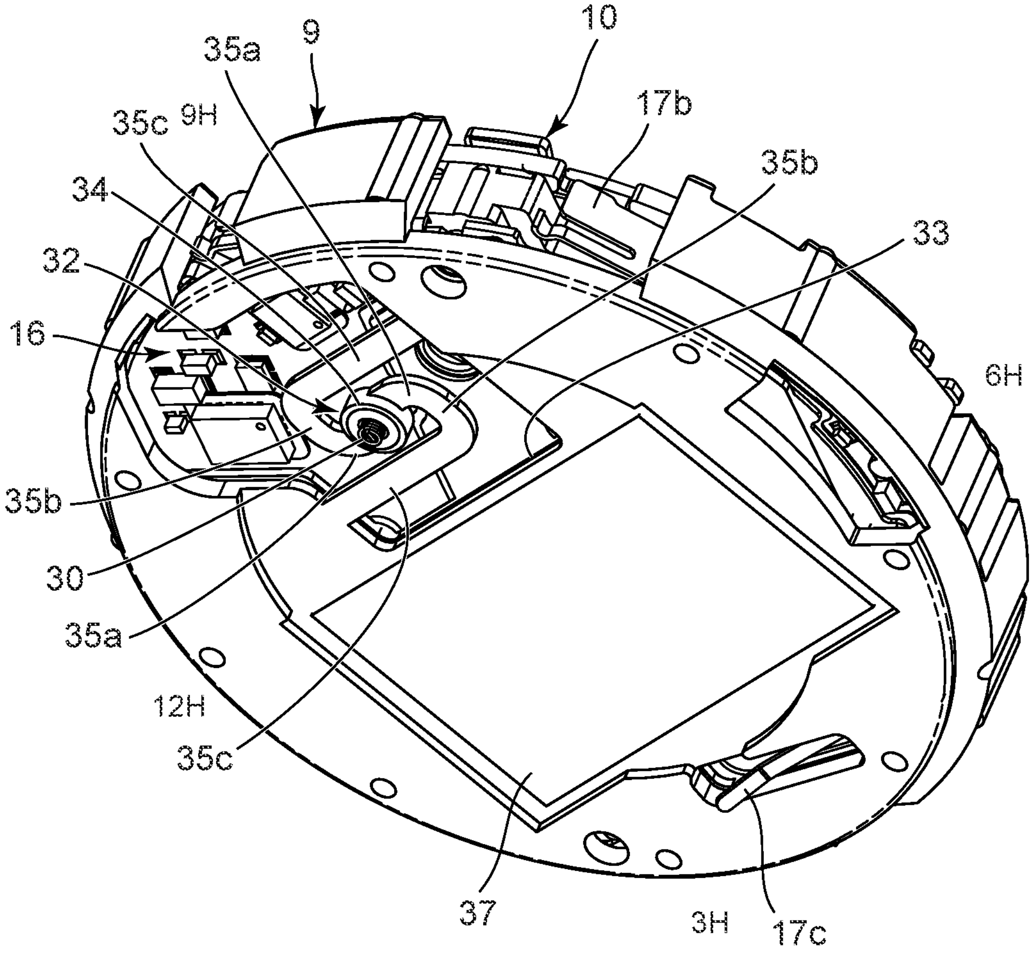
FIG. 7 is an enlarged perspective view showing the timepiece module in the middle frame of FIG. 6 when viewed from below.

The back cover 8 is structured such that a plate spring section 17*c* provided on the four o'clock side of the base plate 17 comes in contact with an upper surface (inner surface) portion of the back cover 8 located around the outer circumference of the piezoelectric element 25, as shown in FIG. 3, FIG. 7, and FIG. 9. As a result, the plate spring section 17*c* is structured to electrically connect the circuit board 16 with the undersurface of the piezoelectric element 25 via the back cover 8.

On the upper surface of the piezoelectric element 25, an electric conduction guard plate 28 is provided, as shown in FIG. 11B. This electric conduction guard plate 28, which protects the upper surface of the piezoelectric element 25, is made of a conductive metal such as stainless steel. As a result, the upper surface of the piezoelectric element 25 is electrically connected to the circuit board 16 by a coil spring 30 which is a resilient conductive member via the electric conduction guard plate 28.

Figure 12A:
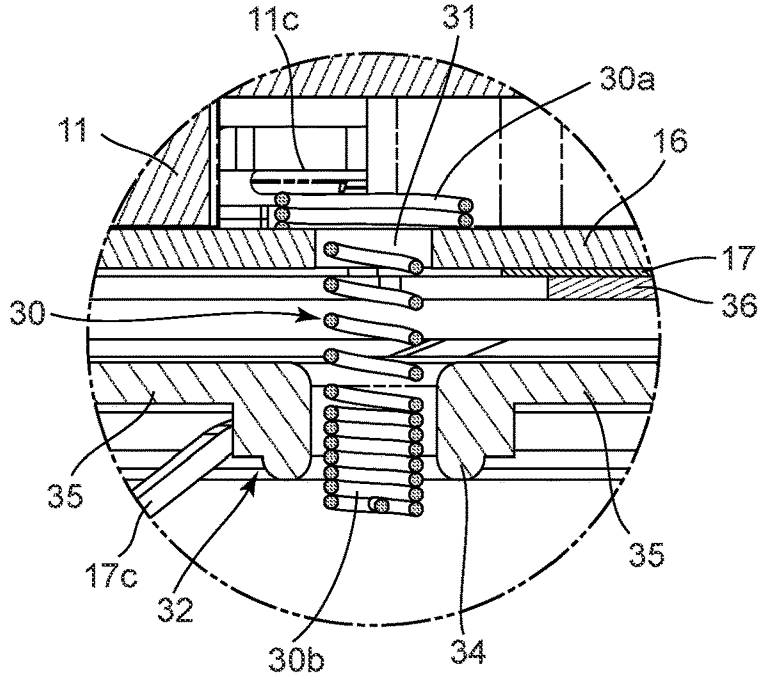
FIG. 12A is an enlarged sectional view of an A portion of the wristwatch shown in FIG. 4.
Figure 12B:
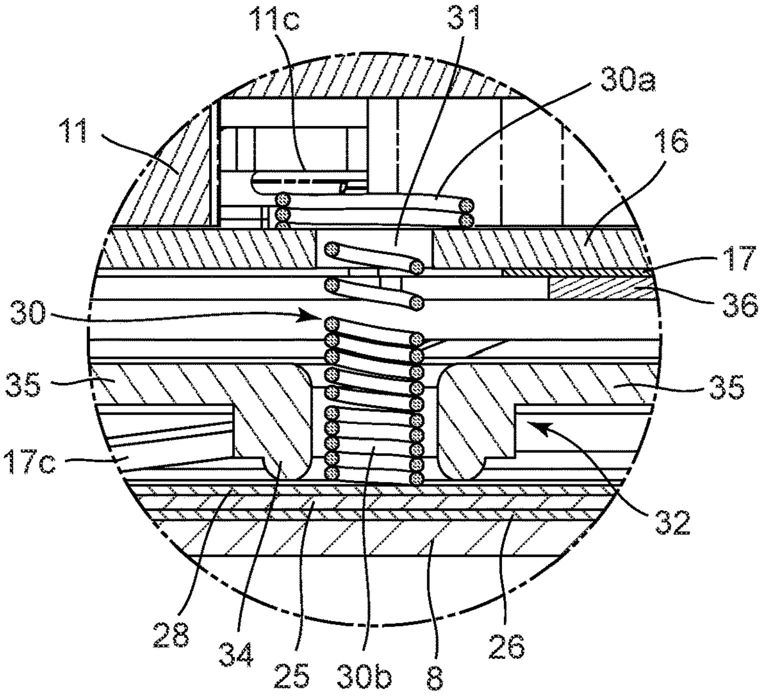
FIG. 12B is an enlarged sectional view showing the A portion in FIG. 12A with the back cover being attached to the lower part thereof.

The coil spring 30 is made of a conductive metal such as stainless steel, as shown in FIG. 12A and FIG. 12B. This coil spring 30 has a large-diameter section 30*a* and a small-diameter section 30*b*. The large-diameter section 30*a* is formed such that its outer diameter is greater than the inner diameter of a connection hole 31 formed penetrating vertically in the circuit board 16, and the small-diameter section 30*b* is formed such that its outer diameter is slightly shorter than the inner diameter of the connecting hole 31 of the circuit board 16.

Also, this small-diameter section 30*b* is formed such that its axial length, that is, its vertical length is greatly longer than the vertical length of the large-diameter section 30*a* and slightly longer than the length from the circuit board 16 to the bottom of the middle frame 9, as shown in FIG. 12A and FIG. 12B. As a result, the coil spring 30 is structured such that the small-diameter section 30*b* is inserted from above into the connection hole 31 of the circuit board 16 and protrudes below the circuit board 16, and this protruding lower end resiliently comes in contact with the upper surface of the piezoelectric element 25 of the back cover 8 via the electric conduction guard plate 28, whereby the upper surface of the piezoelectric element 25 and the circuit board 16 are electrically connected to each other.

Also, the coil spring 30 is structured such that, by a hold-down member 11*c* provided in the housing 11, the large-diameter section 30*a* is resiliently pressed against the upper surface of the outer circumferential portion of the connection hole 31 in the circuit board 16 with the small-diameter section 30*b* protruding below the circuit board 16, as shown in FIG. 12A and FIG. 12B.

Moreover, the coil spring 30 is structured such that, when pressed against the upper surface of the circuit board 16, the large-diameter section 30*a* comes in contact with an electrode (not shown) provided on the upper surface of the outer circumferential portion of the connection hole 31 in the circuit board 16, whereby this coil spring 30 is electrically connected to the circuit board 16. As a result, the coil spring 30 is structured to electrically connect the upper surface of the piezoelectric element 25 and the circuit board 16 via the electric conduction guard plate 28.

Figure 10:
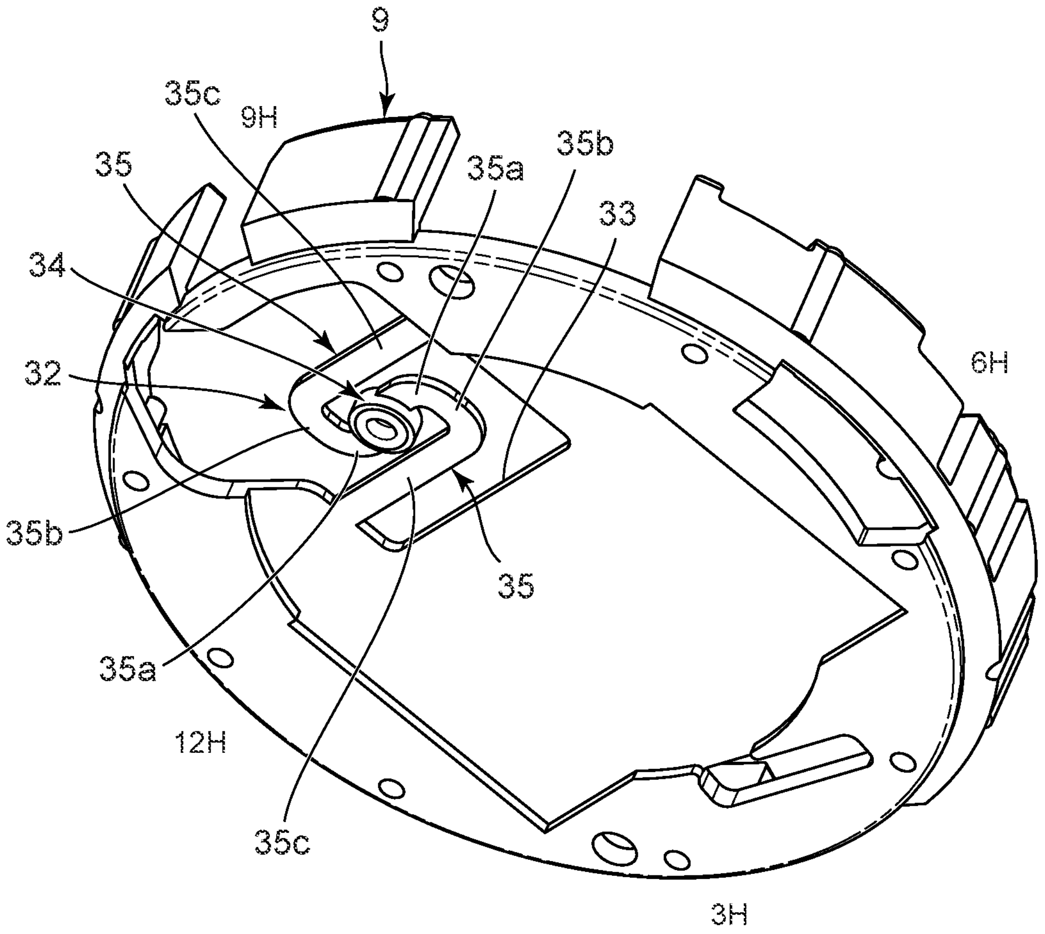
FIG. 10 is an enlarged perspective view showing the middle frame of FIG. 7 when viewed from below.

Furthermore, the coil spring 30 is structured such that, by a resilient guide holding section 32 which is a resilient guide holding member, the small-diameter section 30*b* is guided to be deformed in vertical directions that are opposing directions of the circuit board 16 and the piezoelectric element 25, as shown in FIG. 12A and FIG. 12B. More specifically, the resilient guide holding section 32 is formed to be positioned in an opening section 33 provided in an area extending from the center of the bottom part of the middle frame 9 for housing and holding the housing 11 to the ten o'clock side thereof, as shown in FIG. 3, FIG. 7, and FIG. 10.

The middle frame 9 is made of a synthetic resin such as polyacetal (POM). Similarly, the resilient guide holding section 32 is made of a synthetic resin such as polyacetal (POM), which is integrally formed in the bottom part of the middle frame 9, as shown in FIG. 3, FIG. 7, FIG. 10, FIG. 12A, and FIG. 12B. This resilient guide holding section 32 includes a guide section 34 which guides the small-diameter section 30*b* of the coil spring 30 in the vertical directions and a spring section 35 which is a resilient holding portion that holds the guide section 34 such that it can be resiliently moved in the vertical directions.

The guide section 34, which is a cylindrical section where the small-diameter section 30*b* of the coiled spring 30 is inserted in a manner to be movable in axial directions which are vertical directions, is formed such that its length (height) is substantially equal to the thickness of the bottom part of the middle frame 9, as shown in FIG. 3, FIG. 7, FIG. 10, FIG. 12A, and FIG. 12B. The spring section 35 includes a plurality of plate springs and, in a planar view, has a substantially S shape as a whole. These plate springs constituting the spring section 35 are formed such that the thickness of each plate spring is substantially half the thickness of the bottom part of the middle frame 9, the cylindrical guide section 34 is provided at the center of the substantially S shape in the planar view, and the ends of the substantially S shape are connected to edges of the opening section 33 of the middle frame 9.

More specifically, the plurality of plate springs serving as the spring section 35 includes a plurality of first extending sections 35*a* extending in mutually opposite directions from outer circumferential portions of the guide section 34, a plurality of curved sections 35*b* extending to be curved in directions different from the above-described mutually opposite directions from the plurality of first extending sections 35*a*, and a plurality of second extending sections 35*c* extending from the plurality of curved sections 35*b* in directions different from the extending directions of the plurality of first extending sections 35*a* so as to reach the edges of the opening section 33 of the middle frame 9, as shown in FIG. 3, FIG. 7, FIG. 10, FIG. 12A, and FIG. 12B.

For example, the plurality of first extending sections 35*a* extends from the seven o'clock side and one o'clock side of the outer circumferential surface of the guide section 34 in directions opposite to the seven o'clock side and the one o'clock side, as shown in FIG. 3. Of the plurality of curved sections 35*b*, the curved section 35*b* on the seven o'clock side is curved at an end of the first extending section 35*a* on the seven o'clock side toward the four o'clock side, and the curved section 35*b* on the one o'clock side is curved at an end of the first extending section 35*a* on the one o'clock side toward the ten o'clock side.

Also, of the plurality of second extending sections 35*c*, the second extending section 35*c* on the four o'clock side linearly extends toward the one o'clock side from the four o'clock side end of the curved section 35*b* on the seven o'clock side, and reaches an inner peripheral edge portion of the opening section 33 of the middle frame 9 on the one o'clock side, as shown in FIG. 3. The second extending section 35*c* on the ten o'clock side linearly extends toward the seven o'clock side from the ten o'clock side end of the curved section 35*b* on the one o'clock side, and reaches an inner peripheral edge portion of the opening section 33 of the middle frame 9 on the seven o'clock side.

As a result, by the plurality of plate springs, the spring section 35 is formed in a substantially S shape as a whole in a planar view, and thereby structured such that the guide section 34 can be linearly, that is, vertically moved in the vertical directions of the timepiece module 10 without being laterally oscillated, as shown in FIG. 12A and FIG. 12B.

As a result of this structure, the coil spring 30 is structured such that, when the back cover 8 is being attached to the lower part of the wristwatch case 1 with the small-diameter section 30*b* being positioned in the connection hole 31 of the circuit board 16 and the large-diameter section 30*a* being pressed against the electrode (not shown) on the upper surface of the circuit board 16, deformation such as the buckling of the small-diameter section 30*b* does not occur by the presence of the resilient guide holding section 32 in spite of the piezoelectric element 25 being rotated to be gradually moved upward together with the back cover 8 and pressed against the lower end of the small-diameter section 30*b* via the electric conduction guard plate 28, as shown in FIG. 12A and FIG. 12B.

That is, the coil spring 30 is structured such that, when the piezoelectric element 25 is being rotated to be gradually moved upward together with the back cover 8 that is attached to the lower part of the wristwatch case 1 with the lower end of the small-diameter section 30*b* being pressed against the piezoelectric element 25 via the electric conduction guard plate 28, the small-diameter section 30*b* is not deformed to be buckled but deformed to be compressed by being guided in a vertical direction by the guide section 34 of the resilient guide holding section 32 in spite of the lower end of the small-diameter section 30*b* being relatively moved on the electric conduction guard plate 28 of the piezoelectric element 25 along with the rotation and movement of the piezoelectric element 25, as shown in FIG. 12A and FIG. 12B.

Also, the coil spring 30 is structured such that, when the piezoelectric element 25 is rotated to be gradually moved upward together with the back cover 8 that is attached to the lower part of the wristwatch case 1, the upper surface of the electric conduction guard plate 28 of the piezoelectric element 25 approaches and comes in contact with the lower end surface of the guide section 34 of the resilient guide holding section 32, whereby stress in the coil spring 30 is lightened as compared to the above-described conventional technology having the buckling prevention section, the repulsion force of the coil spring 30 with respect to the piezoelectric element 25 is reduced to a low level, and loads on the piezoelectric element are suppressed, as shown in FIG. 12A and FIG. 12B.

As such, the piezoelectric element 25 is structured such that the repulsion force of the coil spring 30 with respect to the piezoelectric element 25 when the lower end of the small-diameter section 30*b* of the coil spring 30 is pressed against the piezoelectric element 25 via the electric conduction guard plate 28 is reduced to a low level as compared to the above-described conventional technology, and therefore loads on the piezoelectric element 25 due to the repulsion force of the coil spring 30 are suppressed, whereby the volume of a sound by vibration generated by a voltage being applied satisfies a specified value, as shown in FIG. 12A and FIG. 12B.

Also, the coil spring 30 is structured such that, when the back cover 8 is rotated to be loosened and the piezoelectric element 25 and the back cover 8 are moved downward in a direction away from the circuit board 16, the small-diameter section 30*b* gradually expands and protrudes from and below the guide section 34 of the resilient guide holding section 32, as shown in FIG. 12A and FIG. 12B.

That is, the coil spring 30 and the resilient guide holding section 32 are structured such that, when the back cover 8 is detached from the main body case 4, the small-diameter section of the coil spring 30 returns to its initial state, and the guide section 34 of the resilient guide holding section 32 and the spring section 35 thereof also return to their initial states, as shown in FIG. 12A and FIG. 12B. As a result, the spring section 35 is structured not to be plastically deformed when the back cover 8 is screwed onto the main body case 4 and tightened.

Next, a procedure for assembling this wristwatch is described.

First, the timepiece module 10 is assembled. In this assembly, first, the time indication display section 12, the display panel 13, and the secondary information display section 14 are arranged in the housing 11. More specifically, the time indication display section 12 is arranged corresponding to a substantially central portion of the housing 11, the display panel 13 is arranged corresponding to the five o'clock side of the housing 11, and the secondary information display section 14 is arranged corresponding to a substantially nine o'clock side of the housing 11.

In this state, the circuit board 16 is arranged on the undersurface of the housing 11. Here, the time instruction display section 12, the display panel 13, and the auxiliary information display 14 are electrically connected to the circuit board 16. In addition, the coil spring 30 is attached to the circuit board 16. More specifically, the small-diameter section 30*b* of the coil spring 30 is inserted from above into the connection hole 31 of the circuit board 16 in a manner to protrude below the circuit board 16 and, in this state, the large-diameter section 30*a* is arranged on the upper surface of the outer circumferential portion of the connection hole 31.

Then, the base plate 17 is arranged under the circuit board 16, and the plurality of hook sections 17*a* formed upright on the outer circumferential portions of the base plate 17 is locked to the plurality of projection sections 11*b* formed on outer circumferential portions of the housing 11. As a result, the circuit board 16 is attached to the undersurface of the housing 11 by the base plate 17, and the contact springs 17*b* formed on the plurality of hook sections 17*a* are arranged on the two o'clock side, four o'clock side, eight o'clock side, and ten o'clock side of the housing 11.

Here, the large-diameter section 30*a* of the coil spring 30 is pressed against the upper surface of the circuit board 16 by the hold-down member 11*c* provided in the housing 11. As a result, the large-diameter section 30*a* is resiliently connected to the electrode (not shown) provided on the upper surface of the outer circumferential portion of the connection hole 31 in the circuit board 16, and thereby electrically connected to the circuit board 16. In the housing 11, the time indication display section 12, the display panel 13, and the secondary information display section 14 have been mounted with them being electrically connected to the circuit board 16.

Then, the solar panel 22 is arranged on the upper surface of the housing 11, and the second dial plate 21 is arranged on the solar panel 22. In this state, the hold-down plate 18 having a ring shape is arranged on an upper surface portion of the housing 11 located around the outer circumferences of the solar panel 22 and the second dial plate 21, and the first dial plate 20 is arranged on the hold-down plate 18. In addition, the pointer shaft (not shown) of the time indication display section 12 is inserted into through holes (not shown) coaxially formed in the center of the solar panel 22, the center of the second dial plate 21, and the center of the first dial plate 20.

Here, the display area of the display panel 13 is positioned corresponding to the display window sections 20*b* formed on a substantially five o'clock side of the solar panel 22, a substantially five o'clock side of the second dial plate 21, a substantially five o'clock side of the first dial plate 20. In addition, the sub-pointer shaft 14*b* of the secondary information display section 14 is inserted into the insertion holes 23 coaxially formed on a substantially nine o'clock side of the solar panel 22 and a substantially nine o'clock side of the second dial plate 21, and thereby arranged in the circular sub-display opening section 20*a* formed on a substantially nine o'clock side of the first dial plate 20.

In this state, when attached to the pointer shaft (not shown) of the time indication display section 12, the pointers 12*a* are set in a state where they can be driven above the first dial plate 20. In addition, when attached to the sub-pointer shaft 14*b* of the secondary information display section 14, the sub-pointer 14*a* is positioned in the circular sub-display opening section 20*a* of the first dial plate 20, and set in a state where it can be rotated above the second dial plate 21. As a result of this procedure, the assembly of the timepiece module 10 is completed.

Next, a procedure for mounting the timepiece module 10 assembled as described above in the wristwatch case 1 is described.

In this procedure, first, the ring-shaped parting member 7 is inserted from above into the upper part of the main body case 4 of the wristwatch case 1, and arranged on the ring-shaped flange section 4*a* provided in the main body case 4. In this state, the watch glass 6 is fitted from above into the upper opening of the main body case 4 together with the packing 6*a*, and the parting member 7 is pressed against and fixed on the flange section 4*a* of the main body case 4 by this watch glass 6.

Subsequently, a first buffering member 36 is arranged on the undersurface of the timepiece module 10, and the timepiece module 10 is arranged in the middle frame 9. Here, the small-diameter section 30*b* of the coil spring 30 protruding below the circuit board 16 is inserted into the guide section 34 of the resilient guide holding section 32 in the bottom part of the middle frame 9 such that a lower end portion of the small-diameter section 30*b* protrudes below the guide section 34. In this state, the timepiece module 10 is inserted from below into the main body case 4 together with the middle frame 9, and the outer circumferential portion of the first dial plate 20 of the timepiece module 10 is brought into contact with the undersurface of the flange section 4*a* of the main body case 4.

Then, the push button switches 3 are attached to the two o'clock side, four o'clock side, eight o'clock side, and ten o'clock side of the main body case 4. Here, these plural push button switches 3 are positioned corresponding to the plurality of contact springs 17*b* provided on the base plate 17 of the timepiece module 10. In this state, the exterior case 5 is attached to the outer circumferential portion of the main body case 4. Here, the first exterior member 5*a* of the exterior case 5 is attached to the outer circumferential portion of the main body case 4, and the second exterior member 5*b* of the exterior case 5 is attached to the outer circumferential portion of this first exterior member 5*a* and the upper part of the main body case 4. As a result, the assembly of the wristwatch case 1 is completed.

In this state, the back cover 8 is attached to the lower part of the wristwatch case 1, or more specifically, the lower part of the main body case 4. Before this attachment, a second buffering member 37 is arranged on the undersurface of the bottom part of the middle frame 9. In addition, the piezoelectric element 25 is attached to the inner surface (upper surface) of the back cover 8 by the adhesion layer 26. Here, the undersurface of the piezoelectric element 25 and the back cover 8 are electrically connected to each other by the conductive section 27 provided on the center of the undersurface of the piezoelectric element 25. Then, the electric conduction guard plate 28 is arranged on the upper surface of the piezoelectric element 25, and the back cover 8 is attached to the lower part of the main body case 4.

In this attachment, the male screw section 8*c* formed on the outer circumferential surface of the frame section 8*b* of the back cover 8 is screwed into the female screw section 4*b* in the inner circumferential surface of the lower opening of the main body case 4 and tightened. As a result, the back cover 8 is attached to the lower part of the main body case 4. Here, since the back cover 8 is gradually moved toward the upper side of the main body case 4 while being laterally rotated, the small-diameter section 30*b* of the coil spring 30 is guided by the guide section 34 of the resilient guide holding section 32 and the lower part of the small-diameter section 30*b* is pressed into the guide section 34.

Here, since the guide section 34 has been held in a manner to be resiliently movable in the vertical directions of the timepiece module 10 by the spring section 35, or in other words, since the spring section 35 has a substantially S shape as a whole in a planar view by including the plurality of plate springs, the guide section 34 is linearly, that is, vertically moved in the vertical directions of the timepiece module 10 without being laterally oscillated.

Therefore, when the back cover 8 is being attached to the lower part of the wristwatch case 1 with the small-diameter section 30*b* of the coil spring 30 being positioned in the connection hole 31 of the circuit board 16 and the large-diameter section 30*a* thereof being pressed against the electrode (not shown) on the upper surface of the circuit board 16, the small-diameter section 30*b* is not deformed to be buckled but deformed to be compressed by the presence of the resilient guide holding section 32 in spite of the piezoelectric element 25 being rotated to be gradually moved upward together with the back cover 8 and pressed against the lower end of the small-diameter section 30*b* via the electric conduction guard plate 28.

That is, when the piezoelectric element 25 is being rotated to be gradually moved upward together with the back cover 8 that is attached to the lower part of the wristwatch case 1 with the lower end of the small-diameter section 30*b* of the coil spring 30 being pressed against the piezoelectric element 25 via the electric conduction guard plate 28, the small-diameter section 30*b* is not deformed to be buckled by being guided in a vertical direction by the guide section 34 of the resilient guide holding section 32 in spite of the lower end of the small-diameter section 30*b* being relatively moved on the electric conduction guard plate 28 of the piezoelectric element 25 along with the rotation and movement of the piezoelectric element 25.

Also, when the piezoelectric element 25 is rotated to be gradually moved upward together with the back cover 8 that is attached to the lower part of the wristwatch case 1, the upper surface of the electric conduction guard plate 28 of the piezoelectric element 25 approaches and comes in contact with the lower end surface of the guide section 34 of the resilient guide holding section 32, whereby the repulsion force of the middle frame 9 (the guide section 34) with respect to the piezoelectric element 25 is reduced to a low level as compared to the above-described conventional technology having the buckling prevention section. Accordingly, the circuit board 16 and the upper surface of the piezoelectric element 25 are connected with loads on the piezoelectric element 25 being suppressed.

As such, the repulsion force of the middle frame 9 (the guide section 34) with respect to the piezoelectric element 25 when the lower end of the small-diameter section 30*b* of the coil spring 30 is pressed against the piezoelectric element 25 via the electric conduction guard plate 28 is reduced to a low level, and therefore loads on the piezoelectric element 25 are suppressed as compared to the above-described conventional technology having the buckling prevention section, whereby the volume of a sound by the vibration of the piezoelectric element 25 generated by a voltage being applied to the piezoelectric element 25 satisfies a specified value.

Here, the plate spring section 17*c* provided on the four o'clock side of the base plate 17 comes in contact with an inner surface portion of the back cover 8 located around the outer circumference of the piezoelectric element 25. As a result, the back cover 8 to which the undersurface of the piezoelectric element 25 has been connected is electrically connected to the circuit board 16. Accordingly, the piezoelectric element 25 is electrically connected to the circuit board 16 by an electrode on its upper surface side being connected to the circuit board 16 by the coil spring 30 and an electrode on its lower surface side being connected to the circuit board 16 by the plate spring section 17*c* of the base plate 17.

In a case where the back cover 8 is detached from the lower part of the main body case 4, the back cover 8 is rotated and loosened. Here, the piezoelectric element 25 is moved downward in a direction away from the circuit board 16 together with the back cover 8, whereby the small-diameter section 30*b* of the coil spring 30 gradually expands and protrudes below the guide section 34. Then, when the back cover 8 is detached from the main body case 4, the small-diameter section 30*b* of the coil spring 30 and the resilient guide holding section 32 return to their initial states.

Next, the usage of the wristwatch worn on an arm is described.

In the case of this wristwatch, normally, information such as a time of day, a date, and a day of the week, and sub-functional information such as the remaining battery level of the battery 15 can be checked by the timepiece module 10. That is, the pointers 12*a* of the time indication display section 12 of the timepiece module 10 are driven above the first dial plate 20 so as to indicate the time, whereby the time can be checked.

In addition, the display panel 13 of the timepiece module 10 electro-optically displays information such as a time of day, a date, and a day of the week, whereby the information such as a time of day, a date, and a day of the week can be checked through the display window sections 20*b*. Moreover, the sub-pointer 14*a* of the secondary information display section 14 of the timepiece module 10 is rotated above the second dial plate 21 in the sub-display opening section 20*a* of the first dial plate 20 so as to indicate sub-functional information such as the remaining battery level of the battery 15, whereby the sub-functional information such as the remaining battery level of the battery 15 can be checked.

When a preset time is reached, an alarm sound is emitted. More specifically, when a preset time is reached, a voltage is applied to the piezoelectric element 25 from the circuit board 16. As a result, the piezoelectric element 25 is vibrated and resonates the back cover 8, whereby an alarm sound is emitted to inform that the set time has been reached.

In the present embodiment, stress in the coil spring 30 is lightened as compared to the above-described conventional technology having the buckling prevention section, and the repulsion force of the coil spring 30 with respect to the piezoelectric element 25 and the repulsion force of the middle frame 9 (the guide section 34) with respect to the piezoelectric element 25 are reduced to low levels, whereby loads on the piezoelectric element 25 are suppressed and the volume of a sound by the vibration of the piezoelectric element 25 generated by a voltage being applied to the piezoelectric element 25 satisfies a specified value. As a result of this structure, alarm sounds can be favorably emitted.

As described above, this wristwatch includes the circuit board 16 which is a first contact member, the piezoelectric element 25 which is a second contact member arranged opposing the circuit board 16, the coil spring 30 which is a resilient conductive member for electrically connecting the circuit board 16 with the piezoelectric element 25, and the resilient guide holding section 32 having the guide section 34 which guides the coil spring 30 in the vertical directions that are the opposing directions of the circuit board 16 and the piezoelectric element 25, and the spring section 35 which is a resilient holding portion that holds the guide section 34 such that the guide section 34 can be resiliently moved in the vertical directions, whereby deformation such as buckling can be prevented and the stress can be lightened.

That is, in the case of this wristwatch where the guide section 34 of the resilient guide holding section 32 is held by the spring section 35 in a manner to be resiliently movable in the vertical directions and the coil spring 30 is guided in the vertical directions by the guide section 34, deformation such as the buckling of the coil spring 30 can be reliably and favorably prevented even when the piezoelectric element 25 approaches the circuit board 16 while being laterally rotated. In addition, the repulsion force of the middle frame 9 (the guide section 34) with respect to the piezoelectric element 25 can be reduced to a low level, whereby loads on the piezoelectric element 25 can be suppressed as compared to the above-described conventional technology having the buckling prevention section.

Also, in the case of this wristwatch, the spring section 35 has a plurality of plate springs including the plurality of first extending sections 35*a* extending in mutually opposite directions from the guide section 34, the plurality of curved sections 35*b* extending to be curved in directions different from the above-described mutually opposite directions from the plurality of first extending sections 35*a*, and the plurality of second extending sections 35*c* extending from the plurality of curved sections 35*b* in directions different from the extending directions of the plurality of first extending sections 35*a*, whereby the guide section 34 can be linearly moved in up-and-down directions or, in other words, resiliently moved in vertical directions without being laterally oscillated. Accordingly, deformation such as the buckling of the coil spring 30 can be prevented and the stress of the guide section 34 formed on the bottom of the middle frame 9 can be lightened, whereby loads on the opposing member can be reduced.

As such, in the case of this wristwatch, the guide section 34 can be linearly moved in the up-and-down directions or, in other words, resiliently moved in the vertical directions by the spring section 35 without being laterally oscillated, whereby the stress of the middle frame 9 (the guide section 34) can be lightened and the repulsion force of the middle frame 9 (the guide section 34) with respect to the piezoelectric element 25 can be reduced to a low level. As a result, loads on the piezoelectric element 25 can be suppressed as compared to the above-described conventional technology having the buckling prevention section, whereby the circuit board 16 and the piezoelectric element 25 can be reliably and favorably connected to each other, and the piezoelectric element 25 can be favorably vibrated so as to favorably emit sounds.

Also, in the case of this wristwatch, even when the piezoelectric element 25 serving as a second contact member is laterally rotated so as to be moved in a vertical direction that is an opposing direction of the circuit board 16 and the piezoelectric element 25, deformation such as the buckling of the coil spring 30 can be reliably and favorably prevented by the resilient guide holding section 32. As a result of this structure, the circuit board 16 and the piezoelectric element 25 can be reliably and favorably connected to each other by the piezoelectric element 25 approaching the circuit board 16.

Moreover, in this wristwatch, the circuit board 16 serving as a first contact member is mounted in the housing 11 that is arranged in the wristwatch case 1, and the resilient guide holding section 32 is provided in the middle frame 9 that holds the housing 11 so that the housing 11 is arranged in the wristwatch case 1. As a result of this structure, the resilient guide holding section 32 is not required to be manufactured as a separate part, whereby the number of parts of the wristwatch can be reduced and the assembly thereof can be simplified.

Furthermore, in this wristwatch, the piezoelectric element 25 serving as a second contact member is attached to the inner surface of the back cover 8 that is screwed onto the lower part of the wristwatch case 1. As a result of this structure, the piezoelectric element 25 can be arranged on the lower side of the wristwatch case 1 together with the back cover 8, and the back cover 8 can be used as a diaphragm, whereby sounds such as alarm sounds can be favorably emitted by the vibration of the piezoelectric element 25 being resonated on the back cover 8.

In the above-described embodiment, the spring section 35 of the resilient guide holding section 32 includes a plurality of plate springs which has a substantially S shape in a planar view. However, the spring section 35 of the present invention is not necessarily required to be constituted by a plurality of plate springs. This spring section 35 may be constituted by only one plate spring, or may be constituted by three or more plate springs.

Also, the present invention is not limited to the above-described structure and may have a structure where the spring section 35 of the resilient guide holding section 32 has a spiral shape, a helix shape, or a bellows shape. In addition, the spring section 35 of the resilient guide holding section 32 is not necessarily required to be formed using plate springs, and may be formed using elastic members such as rubber and elastomer. That is, in the present invention, any material can be used to form the resilient guide holding section 32 as long as it can hold the guide section 34 such that the guide section 34 is resiliently or elastically movable in the attachment and detachment directions of the circuit board 16 and the piezoelectric element 25.

Moreover, as a resilient conductive member, the coil spring 30 is used in the above-described embodiment. However, the present invention is not limited thereto. For example, a stick-shaped or pillar-shaped conductive rubber may be used.

Furthermore, in the above-described embodiment, the resilient guide holding section 32 is provided in the middle frame 9. However, the present invention is not limited thereto, and the resilient guide holding section 32 may be provided in the housing 11 or the base plate 17 which is insulative. That is, the resilient guide holding section 32 may be provided in any insulating member of the timepiece module 10 as long as it is a member to be arranged close to the piezoelectric element 25 of the back cover 8. In addition, the resilient guide holding section 32 may be separately manufactured and mounted in the housing 11.

Still further, in the above-described embodiment, the circuit board 16 is a first contact member and the piezoelectric element 25 is a second contact member. However, the present invention is not limited thereto, and the second contact member may be another connecting member such as the solar panel 22. In addition, the first contact member is not necessarily required to be the circuit board 16, and may be another connecting member.

Yet still further, in the above-described embodiment, the present invention has been applied in a wristwatch. However, the present invention is not necessarily required to be applied in a wristwatch. For example, the present invention is applicable to various types of timepieces such as a travel watch, an alarm clock, a table clock, and a wall clock. In addition, the present invention is not necessarily required to be applied in timepieces, and can be applied in electronic devices such as cell-phones and portable information terminals.

While the present invention has been described with reference to the preferred embodiments, it is intended that the invention be not limited by any of the details of the description therein but includes all the embodiments which fall within the scope of the appended claims.

What is claimed is:

1. An electronic device comprising:

a first contact member;

a second contact member arranged opposing the first contact member;

a resilient conductive member electrically connecting the first contact member with the second contact member; and a resilient guide holding member comprising:

a guide portion configured to guide the resilient conductive member in opposing directions of the first contact member and the second contact member; and a resilient holding portion configured to hold the guide portion, wherein the guide portion is a cylindrical portion into which the resilient conductive member is inserted, and wherein the resilient holding portion comprises one or more springs configured to hold the cylindrical portion such that the cylindrical portion is resiliently movable in the opposing directions of the first contact member and the second contact member.

2. The electronic device according to claim 1, wherein the resilient conductive member comprises a coil spring.

3. The electronic device according to claim 1, wherein the one or more springs comprise a plurality of plate springs.

4. The electronic device according to claim 3, wherein the plurality of plate springs comprises:

a plurality of first extending portions extending in mutually opposite directions from the guide portion;

a plurality of curved portions extending to be curved in directions different from the mutually opposite directions from the plurality of first extending portions; and a plurality of second extending portions extending from the plurality of curved portions in directions different from the extending directions of the plurality of first extending portions.

5. The electronic device according to claim 1, wherein each of the one or more springs is formed in a spiral shape.

6. The electronic device according to claim 1, wherein each of the one or more springs is formed in a bellows shape.

7. The electronic device according to claim 1, wherein the second contact member is configured to be moved in one of the opposing directions of the first contact member and the second contact member while being laterally rotated such that the resilient conductive member is guided by the guide portion and a portion of the resilient conductive member is pressed into the guide portion.

8. The electronic device according to claim 1, wherein the first contact member is mounted in a housing that is arranged in a case.

9. The electronic device according to claim 8, wherein the resilient guide holding member is provided in a middle frame that holds the housing so that the housing is arranged in the case.

10. The electronic device according to claim 9, wherein the second contact member is attached to an inner surface of a back cover that is screwed onto a lower part of the case.

11. A timepiece comprising the electronic device according to claim 1.

* * * * *